July 15, 1924.

J. A. DUXBURY 1,501,043

METAL CUTTING MACHINERY

Filed May 8, 1923

2 Sheets-Sheet 2

INVENTOR:
John A. Duxbury
BY Wm Wallace White
ATTY.

Patented July 15, 1924.

1,501,043

UNITED STATES PATENT OFFICE.

JOHN ANDERSON DUXBURY, OF BAILDON, ENGLAND.

METAL-CUTTING MACHINERY.

Application filed May 8, 1923. Serial No. 637,457.

*To all whom it may concern:*

Be it known that I, JOHN ANDERSON DUXBURY, subject of the King of Great Britain and Ireland, residing at the Tank Works, Otley Road, Baildon, Yorkshire, England, have invented new and useful Improvements in or Relating to Metal-Cutting Machinery, of which the following is a specification.

This invention relates to improvements in machinery used for cutting metal and refers more particularly to the cutting of metal sheets which have their cut edges at given radii, such for example as sheets used in gasometer construction, the manufacture of shaped barrels or tubs, and the like.

The present method is to shear or cut one edge and punch or stamp the other, afterwards clipping or shaping the connections between the cuts or the like to give the desired curve and finish to such edges.

It is my object to arrange and construct a cutting machine with preferably duplicate cutter machines, and in connection with such machines arrange a guide in such wise that as the plate or sheet is fed through the cutters, such plate will be guided and given the direction necessary to cause the desired curved cut to be made. With the machine we may incorporate edge and face guides for the metal sheets which in certain circumstances may be used to advantage.

The form the guiding devices will take may vary considerably but the examples hereinafter given in the nature of a table carrying in one form, curved guide rails, and in another form a series of adjustable rollers or the like will be sufficient to indicate the nature of my invention.

The duplicate cutting devices will be mounted on a suitable gantry in such wise that they may be moved towards or away from each other, and one driving mechanism will operate both cutters, which with suitable change gearing may be run at varying speeds.

In describing my invention in detail reference is made to the accompanying sheets of drawings, similar letters indicating similar parts in which:—

Figure 1:
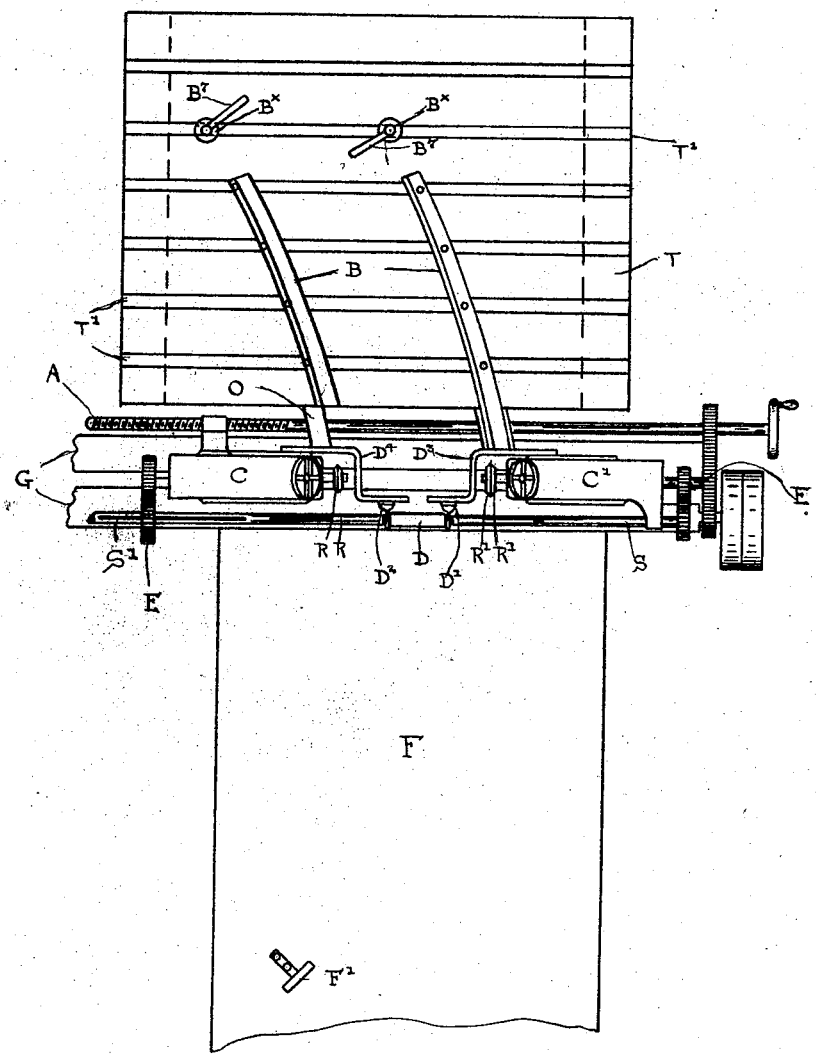

Fig. 1. represents a plan view of the apparatus.

Figure 2:
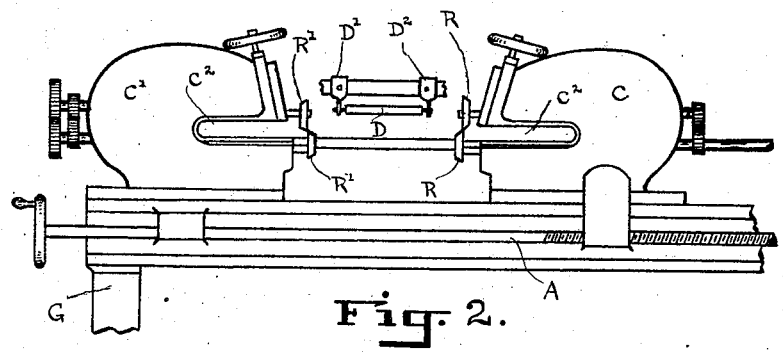

Fig. 2. represents a rear elevation of the cutters.

Figure 3:
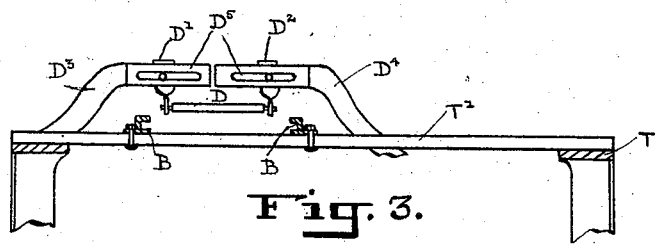

Fig. 3. represents an elevation of the rear table and guides.

Figure 4:
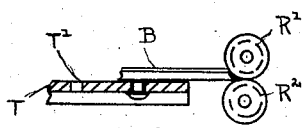

Fig. 4. represents a view of the cutters of one machine and disposition of guide rail.

Figure 5:
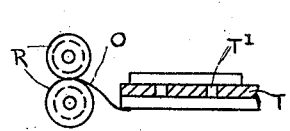

Fig. 5. represents a view of the cutter of the other machine and disposition of the guide rail.

Figure 6:
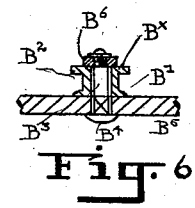

Fig. 6. represents a sectional view of a roller guide.

Figure 7:
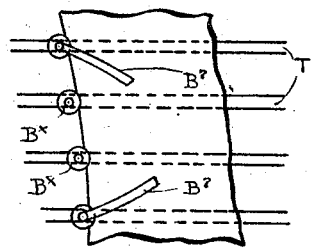

Fig. 7. represents a plan shewing arrangement of roller guides, and

Figure 8:
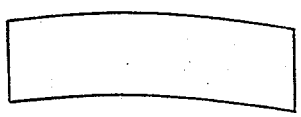

Fig. 8. represents a view of a cut sheet.

To carry my invention into effect whilst I obviously prefer to use two cutters of any suitable rotary type it may in some cases only be necessary to use one cutter, but the guide hereinafter described will in any event act as a guide for two edges of the plate or sheet of metal.

I will therefore describe the duplex type of machine. The machine consists in a suitable gantry G on which are mounted two cutting members C C' having the usual rotary cutting wheels or discs R R and R', with their meeting edges positioned about the centre of the ends of gaps $C^2$ in the heads C C' which carry the cutters as is usual.

The cutting members or heads C C' may one or both be slidably mounted on the gantry G, generally however only one member need be slidable, C, and the other, C', fixed, in which case means comprising screwed shaft A will be provided for moving one head in relation to the other. As it is desirable to drive both sets of cutters a shaft S in connection with the driving gear E will connect the two heads C and C' and said shaft will have a key-way or the like S', Fig. 1, whereby the gear wheel for the moving head may slide along the shaft for adjusting purposes. The said connecting shaft will of necessity be so positioned as not to interfere with the feeding of the sheets.

If it is desired to vary the relative speeds of the cutters R and R' they may vary in size, those operating on the inside or shorter curve being smaller than the others, or by the interposition of suitable gear wheels the speed may be varied in any known manner. Either connected to the gantry G or separate therefrom I mount a rear table T having its front edge as near to the cutting line as is permissible. This table T is provided with a number of slots or the like, T', adapted to carry adjustable pieces either in the nature of curved guide members B or in the nature of grooved rollers B× and these pieces will be clamped in their acting position preferably from above.

In each of the gaps C² in the heads I may mount cross guide pieces adjustable towards or away from the cutters to act as guides for the edges of the sheet to be cut in the manner hitherto employed with single cutting heads.

There will be a front table F over which the sheet is fed and a guide piece such as F' will be provided against which one edge of the sheet may be laid during the feeding of the sheet.

In cutting shaped sheets of metal a usual template is employed and from this template the straight or end edges are marked out and cut in any ordinary manner, the template is then put on the table T and the guide members B or B× are adjusted to the desired inner and outer curve and at the desired distance apart for each edge.

It is not necessary when using rollers B× in lieu of the curved guide member B to place same very close together as any tendency of the sheet to rise when passing from one roller to the next may be checked by spring like fingers B⁷ projecting from the top (or from the roller stud or pivot) towards the next roller, and slightly towards the centre of the sheet. By this construction and arrangement the necessary curves are soon set out, no definite centering is required and the cutters act as feeders and cut the sheet as desired.

As the sheet passes through the machine it is obviously desirable to provide as little waste as possible, therefore as little as may be is cut from the outer edge, and to guide the cut strip from the inner edge I provide a guide plate O, Figs. 1 and 5, from the cutter R to the underside of the table. In the preferred form of grooved rollers, B×, same will have the groove B' inclined towards the table, but the upper edge B² may be horizontal and the roller will be carried on a central stud B³, and be secured in the slot in the table by a bolt with its head B⁴ below provided with a squared shank B⁵ to slide in the slot T' and prevent turning, and an upper nut B⁶ threaded on to the bolt and tightened on to a loose central ring or like in the roller. The roller construction will be seen in Figs. 6 and 7 and a cut sheet in Fig. 8. B⁷ represents the spring guide arm or fingers before referred to.

To prevent buckling of thin sheets when same are fed to the machine, I mount a guide roller D carrying same from the machine or tables and so positioning same as to permit the sheet to pass under same, as illustrated in Figs. 1, 2 and 3. If the gap between the machines is adjustable it will be obvious that the guide roller carrying arms D' D² must also be adjustable, and to this end I carry the arms D' and D² from brackets D³ and D⁴ slotted as at D⁵ to provide for adjustment, this construction is shewn in Figs. 1, 2 and 3.

The device shewn is in the form which I have found best adapted for cutting sheets used, for example, in gas-holder or like construction, for other sheets however the construction and arrangement may vary slightly provided the adjustable guides arranged, as hereinbefore described, on a table are employed.

I declare that what I claim is:—

1. Sheet metal cutting machinery, comprising adjustable duplex rotary cutters, a front table over which the sheet to be cut is fed to the cutters, a rear table adapted to receive the sheet from the cutters, said rear table being provided with guides adapted to be set to the desired curve against which the cut edges will bear and which will guide the sheet to be cut as desired.

2. In sheet metal cutting machinery, the combination of adjustable duplex rotary cutters and anti-bucking means adjacent thereto, a rear table carrying adjustable guides adapted to bear against and guide the cut edges of the sheet and cause same to travel in the desired curve.

In testimony whereof I have signed my name to this specification.

JOHN ANDERSON DUXBURY.

Witness:
CLIVE WAUGH.